US009464882B2

(12) United States Patent
Ohara

(10) Patent No.: US 9,464,882 B2
(45) Date of Patent: Oct. 11, 2016

(54) INTERFEROMETER WITH CONTINUOUSLY VARYING PATH LENGTH MEASURED IN WAVELENGTHS TO THE REFERENCE MIRROR

(71) Applicant: Tetsuo Ohara, North Andover, MA (US)

(72) Inventor: Tetsuo Ohara, North Andover, MA (US)

(73) Assignee: Nanowave, Inc., Needham, MA (US)

( * ) Notice: Subject to any disclaimer, the term of this patent is extended or adjusted under 35 U.S.C. 154(b) by 0 days.

(21) Appl. No.: 13/856,507

(22) Filed: Apr. 4, 2013

(65) Prior Publication Data

US 2013/0265586 A1 Oct. 10, 2013

Related U.S. Application Data

(60) Provisional application No. 61/620,658, filed on Apr. 5, 2012.

(51) Int. Cl.
 *G01B 9/02* (2006.01)
(52) U.S. Cl.
 CPC ................................ *G01B 9/02067* (2013.01)
(58) Field of Classification Search
 CPC ......................... G01B 9/02012; G01B 9/0201
 USPC ................................................... 356/511–516
 See application file for complete search history.

(56) References Cited

U.S. PATENT DOCUMENTS

| 2004/0057054 | A1* | 3/2004 | Toyooka et al. ............... 356/496 |
| 2006/0262320 | A1* | 11/2006 | Kawasaki .......... G01B 9/02004 356/495 |
| 2008/0204762 | A1* | 8/2008 | Izatt et al. ..................... 356/521 |

* cited by examiner

*Primary Examiner* — Hwa Lee
(74) *Attorney, Agent, or Firm* — Chapin Intellectual Property Law, LLC

(57) ABSTRACT

An interferometer in which the path length of the reference beam, measured in wavelengths, is continuously changing in sinusoidal fashion and the interference signal created by combining the measurement beam and the reference beam is processed in real time to obtain the physical distance along the measurement beam between the measured surface and a spatial reference frame such as the beam splitter. The processing involves analyzing the Fourier series of the intensity signal at one or more optical detectors in real time and using the time-domain multi-frequency harmonic signals to extract the phase information independently at each pixel position of one or more optical detectors and converting the phase information to distance information.

18 Claims, 12 Drawing Sheets

INTERFEROMETER WITH CONTINUOUSLY VARYING PATH LENGTH MEASURED IN WAVELENGTHS TO THE REFERENCE MIRROR

CROSS REFERENCE TO RELATED APPLICATIONS

This application claims benefit of the priority of U.S. Provisional Patent Application No. 61/620,658 filed Apr. 5, 2012 entitled INTERFEROMETER WITH CONTINUOUSLY VARYING NUMBER OF WAVELENGTHS TO THE REFERENCE MIRROR.

STATEMENT REGARDING FEDERALLY SPONSORED RESEARCH OR DEVELOPMENT

This invention was made with government support under Order No. NNX09CD59P awarded by NASA on Jan. 22, 2009, and under Award No. IIP-1013289 awarded by NSF on May 11, 2010. The government has certain rights in the invention.

TECHNICAL FIELD

The present application relates to the field of measuring the topology, or surface profile, of a surface, specifically performing high resolution, non-contact measurements, with high signal-to-noise-ratio (SNR), via interferometry.

BACKGROUND

Interferometry is widely used to measure changes in distance and to measure the topology of a surface at the micro level. The latter application is often referred to as surface profiling. The general principle, illustrated with reference to a conventional interferometry system 100 (see FIG. 1), involves splitting a beam 11 of light into two portions 12 and 15, reflecting one portion 12 of the beam 11 from a reference surface 13 and the other portion 15 from a measured surface 16, combining the two portions 12, 15 of the beam 11 into a single beam 18, and detecting the combined, single beam 18 via an optical detector 17. Beams of light illustrated in this and the other drawing figures herein are shown as double lines, signifying the outside opposing edges of the diameter of the beam. The beam that starts from the light source 10 and is reflected from the reference surface 13 and passes to the optical detector 17 is the reference beam, and the beam that starts from the light source 10, is reflected from the measured surface 16 and passes to the optical detector 17 is the measurement beam.

When the optical path length of the reference beam is equal to the optical path length of the measurement beam, then the two beams interfere constructively. If single wavelength light is used and the paths along which the measurement beam and the reference beam travel differ by half a wavelength, then the two beams of light interfere destructively, and the optical detector 17 detects a signal of minimum amplitude. Similarly, whenever the difference between the two paths is $n*(\lambda/2)$, where n is an odd integer and $\lambda$ represents the wavelength of the light, the optical detector 17 again detects a signal of minimum level, and when the difference between the two paths is $m*(\lambda/2)$, where m is an even integer, the optical detector 17 detects a maximum signal. If the object being measured (e.g., the measured surface 16) moves half a wavelength toward or away from the beam splitter 21, the path length of the measurement beam will change by one complete wavelength, and the optical detector 17 will go through one complete cycle of intensity detected by the optical detector 17. A region in which the combined intensity of the reference beam and the measurement beam is at a minimum is referred to as a fringe. Quarter wave plates 22 and 23, shown in FIG. 1, may be optionally inserted in the reference beam path and the measurement beam paths, respectively, to reduce errors caused by reflections, as is known in the art.

When a single optical detector is used to detect the average intensity of beam 18, the optical detector measures the difference in path length between the measurement beam and the reference beam. This configuration is useful to detect changes in distance between the measured surface 16 and the beam splitter 21. If an optical detector with a two dimensional array of optical detecting elements, such as a CCD camera, is used, and the diameter of the light beam is configured to be large enough to illuminate the complete two-dimensional optical detector, then each element of the optical detector acts as a separate optical detector, and the system functions as multiple interferometers operating in parallel. The area of each optical detector element creates a pixel, a word which is a contraction of the words "picture" and "element". When the measured surface is not perfectly smooth, there will be different optical path lengths for different pixels, causing phase differences between the signals at different optical detector elements and therefore different intensity signals at each detector element. The difference in intensity at different optical detector elements can be converted to phase differences, and the phase differences can be converted to distances, yielding a three-dimensional map of the topology of the area seen by the complete two-dimensional optical detector.

While multiple phase calculation methods exist, in general, a complete measurement requires moving the reference surface in multiple discrete increments to capture fringe pattern images at each position of the reference mirror while the measured surface does not move. Once these images are captured the data of the multiple frames are used to calculate the phase information at the corresponding pixels. This surface profiling technique, in which the reference surface moves in multiple discrete steps, is referred to as Phase Shifting Interferometry and equipment using this technique is referred to as a Phase Shifting Interferometer (PSI).

Phase Shifting Interferometers cannot determine a step height with certainty if the height changes instantaneously between neighboring pixels by more than plus or minus $\lambda/2$, because a PSI using single wavelength light cannot distinguish between a phase change of $\Delta\Phi$ and a phase change of $\Delta\Phi+n\lambda$, where $\Delta\Phi$ is the phase difference between the reference beam and the measurement beam and n is an integer. Following a similar principle, in order to measure a surface whose height is changing relatively rapidly from one pixel to another, single wavelength PSIs increment the movement of the reference surface (or the measured surface) by an amount which is less than $\lambda/2$ and assume that n, in the expression $\Delta\Phi+n\lambda/2$, is zero. Moving the reference surface through a fixed distance in small discrete increments and collecting intensity signal information at each position of the reference surface requires considerably more measurement time than acquiring intensity data at a single position of the reference surface.

While interferometers using multiple wavelengths of light, or even white light, are better at measuring step height than single wavelength PSIs, such interferometers require moving the reference surface in discrete increments over a distance far greater than λ/2, where λ is the wavelength used for a single wavelength interferometer, requiring additional measurement time.

The lateral resolution of such a surface profiler is a function of both the size of the elements in the optical detector and of the optics which image the measured surface onto the optical detector elements. In order to obtain better lateral resolution, one uses greater magnification, resulting in a measurement of a smaller area of the measured surface. The software of typical Phase Shifting Interferometer systems can stitch together multiple images, taken by measuring one site, moving the measured surface to another site, measuring at that site, etc., but taking multiple images requires even more time. Further, the assumption behind stitching is that there is no system drift between adjacent images, producing no discontinuities. Thermal drift and vibration can create errors in the stitched images. Errors caused by stitching and the large amount of time required to make measurements of suitable lateral and vertical resolution often make PSIs unsuitable for quality control in a production environment.

Phase Shifting Interferometer measurements often suffer from error sources such as inaccurate knowledge of the exact position of the reference mirror and inaccurate positioning of the intended discrete positions of the reference mirror. Further PSI interferometers cannot distinguish between vibration of the measured surface, such as might be caused by sound waves impinging on the measured surface, from changes in the actual roughness of the measured surface.

It would therefore be desirable to have interferometry systems and methods that avoid at least some of the drawbacks of the conventional interferometry systems and methods described above.

SUMMARY

In accordance with the present application, interferometry systems and methods are disclosed in which the path length of a reference light beam, measured in wavelengths, is continuously changing in sinusoidal fashion, and the interference signal created by combining a measurement light beam and the reference light beam is processed in real time to obtain the physical distance along the measurement light beam between a measured surface and a spatial reference frame such as a beam splitter. The processing involves analyzing the Fourier series of the intensity signals at one or more optical detectors in real time, using the time-domain multi-frequency harmonic signals to extract the phase information independently at each pixel position of one or more optical detectors, and converting the phase information to distance information.

In accordance with a first aspect, the path length of the reference beam changes in a sinusoidal oscillatory fashion. A beam splitter splits a light beam generated by a light source into a first portion and a second portion. Further, a reference surface is disposed substantially perpendicular to the first portion of the beam, and a measured surface is disposed substantially perpendicular to the second portion of the beam. The reference surface moves toward the beam splitter and then away from the beam splitter, while maintaining substantial perpendicularity to the first portion of the beam, in a continuous oscillatory manner that is sinusoidal. The frequency of oscillation of the reference surface is generally lower than the rate at which the optical detector collects data, allowing multiple sets of data per period of oscillation of the reference surface.

The waveform of the intensity at the optical detector is $$I = A + B \cos(\Delta\phi^* \sin(\omega_r t) + \phi),$$

where $A$ is a DC signal offset, $\omega_r$ is the angular frequency of the motion of the reference surface, $B$ is the intensity amplitude of the waveform, $\phi$ is the fringe phase (height information), and $\Delta\phi$ represents the amplitude of the reference mirror modulation or oscillation.

The phase difference information is recovered by real-time analysis of this waveform, enabling a surface profile measuring system in which the test object does not need to be stationary during the measurement. For example, the measured surface can move in the X direction, via the motion of a stage holding the sample or any other suitable mechanism and using one or more position encoders or any other suitable mechanism to determine the precise position of the moving sample, while the system measures in the Y direction. In accordance with this first aspect, the system can detect the phase synchronously, providing surface profile data with high signal-to-noise-ratio (SNR) since noise of frequencies that are not multiples of $\omega_r$ will be filtered out.

In accordance with a second aspect, the optical detector is a two-dimensional array of optical detector elements and the output from the optical detector is two-dimensional intensity data. In accordance with an exemplary aspect, if it is necessary to measure a surface which is larger than the area of the second portion of the beam, then after acquiring one image, the measured surface is displaced in X or Y, the system waits to allow vibration caused by the motion to settle, a new image is acquired, and the system software stitches together the images. The same concept can be extended to acquire additional images, after additional movement of the measured surface in either the X or Y axis, or a combination of both.

In accordance with a third aspect, the optical detector is at least a linear array of optical detector elements and produces one dimensional intensity data, for instance in the Y direction. In accordance with an exemplary aspect, the measured sample moves in the X direction while intensity data in the Y direction are acquired. The effective image created by moving the measured sample can be much larger than that available by using an optical detector that supplies intensity data in two dimensions. If it is necessary to measure larger surfaces, then it is possible to move the measured surface in the Y direction, wait for settling, and then acquire new data while moving the measured surface in the X direction. Similarly, the measured sample could move in the Y direction, and the linear array of optical detector elements could be mounted to take data in the X direction.

In accordance with a fourth aspect, which is useful when measuring round flat objects, such as the surface of magnetic hard disks, the one dimensional array of optical detector elements and/or the measured surface can be configured to move relative to one another to allow the one dimensional optical detector to perform a measurement along a radius of the measured surface. In accordance with an exemplary aspect, the one dimensional array of optical detector elements measures along such a radius and the measured surface is rotated about its center as pixel data are collected. If the length of the one dimensional optical detector is less than the radius needed to be measured, then multiple images can be acquired by moving the linear array of optical detector elements in the appropriate direction along the radius and acquiring data during another rotation of the measured surface. To minimize measurement time, while maintaining a constant effective pixel size, the speed of rotation of the measured surface may be increased as the distance of the linear array of optical detector elements from the center of rotation decreases.

In accordance with the third and fourth aspects described above, the sample moves in one direction, while a linear array of optical detector elements positioned in a substantially perpendicular direction collects intensity data. The image captured during one complete movement of the sample can be increased by increasing the length of the linear array of optical detector elements. This can be achieved by various mechanisms or techniques, including increasing the physical length of the array of optical detector elements or by using multiple interferometers, including multiple linear arrays of optical detectors, operating in parallel and positioned to extend the equivalent length of a single array.

The interferometry system according to the first aspect described above is useful for distance measurement, where the measured surface moves. The method of phase detection via analyzing the complex waveform produced by the oscillating reference mirror and the moving measured surface can be implemented at lower cost than conventional methods, and the performance requirement of the analog to digital converter used to digitize the intensity signal can be lower than required by conventional methods.

In accordance with the second, third, and fourth aspects described above, it is desirable to process intensity data from all the optical detector elements in parallel, in order to create real time, time-domain data. This can be achieved via pipe-lining, in which the same hardware quickly processes data from one optical detector element and then processes data from the next optical detector element at the following processor clock cycle, producing fully processed data at a rate that can be as fast as the rate that data are captured by the entire group of optical detector elements. If lower spatial frequency of the image is allowable, then the rate of data capture can be even faster.

In accordance with a fifth aspect, a data processing approach, referred to herein as "active mixing", allows producing fully processed optical detector intensity data at a rate equal to the rate that intensity data are captured by the optical detector. In accordance with a sixth aspect, another data processing approach, which is referred to herein as "pseudo-active mixing", allows producing fully processed data at one quarter the rate at which data are captured by the optical detector, without the need for modulating the light intensity, thus without incorporating an electro-optic component that can increase cost.

In accordance with a sixth aspect, an interferometry system includes a beam splitter operative to split a source light beam into a reference beam and a first measurement beam. The reference beam and the first measurement beam each have an associated path, and an associated path length measured in wavelengths. A measured sample is disposed in the path of the first measurement beam. The interferometry system further includes a first component operative to vary the path length of the reference beam in a sinusoidal fashion. In addition, the interferometry system includes at least one second component operative to detect at least one second measurement beam that is based upon the reference beam and the first measurement beam, to generate at least one optical detector signal corresponding to the second measurement beam, and to analyze Fourier series components of the optical detector signal in the time-domain to determine a phase shift in the reference beam or the first measurement beam caused by the measured sample, a change in the path length of the reference beam or the first measurement beam, and/or a distance between the beam splitter and the measured sample.

The presently disclosed interferometry systems and methods can acquire surface topology data of a large measured surface at a rate which is faster than conventional systems and methods. Further, the disclosed systems and methods can provide fast surface profile measurements with improved vertical resolution and measurement accuracy. Moreover, the disclosed systems and methods have the ability to capture a high resolution single measurement image of an area that is larger than previously possible using conventional systems and methods. The disclosed systems and methods can also acquire data in real time in order to allow time-domain digital filtering techniques. In addition, the disclosed systems and methods allow simultaneous measurement of a known measured surface, and an unknown measured surface, in order to correct for systematic measurement errors.

Other features, functions, and aspects of the invention will be evident from the Drawings and/or the Detailed Description of the Invention that follow.

BRIEF DESCRIPTION OF THE DRAWINGS

The invention will be more fully understood with reference to the following Detailed Description of the Invention in conjunction with the drawings of which.

DETAILED DESCRIPTION

The disclosure of U.S. Provisional Patent Application No. 61/620,658 filed Apr. 5, 2012 entitled INTERFEROMETER WITH CONTINUOUSLY VARYING NUMBER OF WAVELENGTHS TO THE REFERENCE MIRROR is incorporated herein by reference in its entirety.

Figure 1:
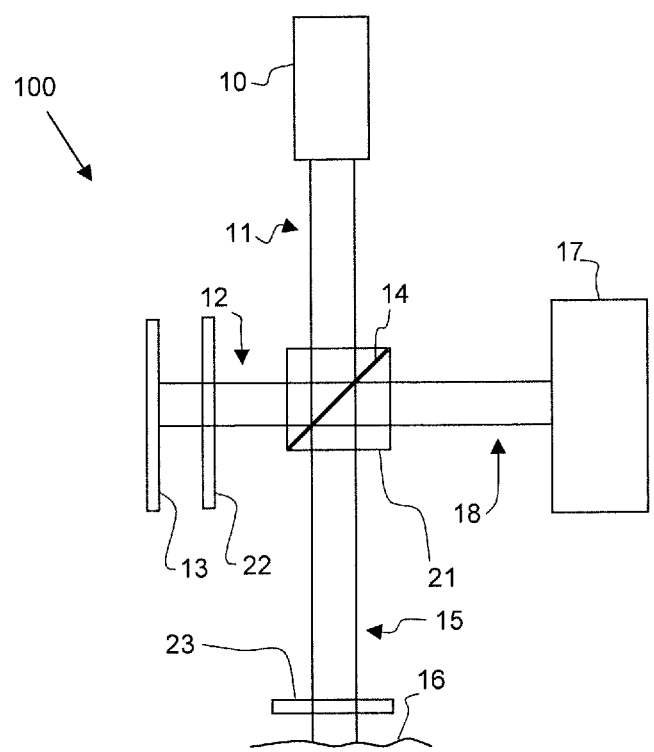
FIG. 1 is a schematic diagram showing a conventional Michelson interferometer.
Figure 2:
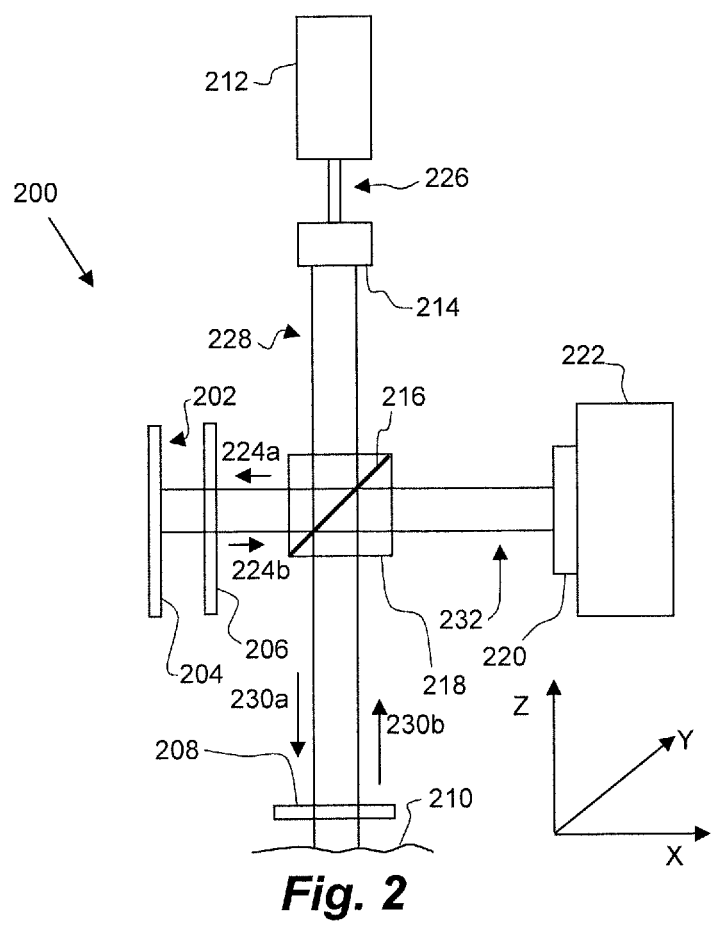
FIG. 2 is a schematic diagram showing an interferometry system configured for surface profiling, in accordance with an exemplary embodiment of the present application.

FIG. 2 shows an interferometry system 200, such as a Michelson interferometer, functioning as the optical sensing apparatus for surface profiling. It includes of a monochromatic light source 212, a beam expander 214, a beam splitter 218 with partially mirrored surface 216, a reference mirror 202 with reference surface 204, a measured surface 210, an objective lens 220, and an optical detector 222.

The monochromatic light source 212 emits a light beam 226. The diameter of the beam 226 is enlarged via the beam expander 214 to produce a light beam 228 whose diameter is large enough to illuminate the desired image area of the measured surface 210. For example, the diameter of the beam 226 might be 2-3 mm, and the beam expander 214 might be a 10× beam expander, to produce the beam 228 whose diameter is 20-30 mm. The beam 228 is split into two portions of approximately equal intensity 224a and 230a, for example via the beam splitter 218 whose internal mirrored surface 216 is approximately 50% reflective to the wavelength of light emitted from the light source 212 at an angle of incidence of 45 degrees. Such beam splitters are commonly available. For example, the model CM1-BS1 beam splitter, manufactured by Thorlabs, or any other suitable beam splitter, may be employed. It is noted that a parallel plate mirror can be used instead of a beam splitter cube.

The beam 224a reflects from the reference surface 204 and creates a light beam 224b. Similarly the beam 230a reflects from the measured surface 210 and creates a light beam 230b. The reflected beam 224b enters the beam splitter 218, and approximately 50% of the beam travels through the partially mirrored surface 216 toward the optical detector 222. Similarly the reflected beam 230b travels toward the beam splitter 218 and is reflected from the partially mirrored surface 216 toward the optical detector 222. Thus, the light beam 232 is a combination of the beam 224b reflected from the reference surface 204 and the beam 230b reflected from the measured surface 210.

The reference surface 204 is the surface of the reference mirror 202. The reference mirror 202 is positioned with the reference surface 204 substantially perpendicular to the beams 224a, 224b. The reference surface 204 is substantially flat, and portions of the beam 224b reflected from one area within the reference surface 204 experience substantially the same optical path length as portions of the beam 224b reflected from other areas within the reference surface 204. Reference mirrors with flat surfaces are commonly available in different flatness specifications. Deviations from an ideal, perfectly flat, reference mirror create systematic errors in the measurement. These errors can be subtracted from the measurement of the measured surface, by storing the error at each optical detector element, determined when measuring a known, flat surface.

The beam 232 passes through the objective lens 220 and onto the optical detector 222. The optical detector 222 can be a single point detector, a linear array of optical detector elements, a two-dimensional array of optical detector elements, or any other suitable optical detector. In the case of either a linear array of optical detector elements, often referred to as a "linear detector", or a two-dimensional array of optical detector elements, each element creates one pixel of information. The physical size of each element, reduced by the magnification of the objective lens determines the measurement area of each pixel. For example, an optical detector element whose physical size is a square area 10 microns on a side and a 5× objective lens allows measuring 2 micron pixels of the measured surface.

Figure 3:
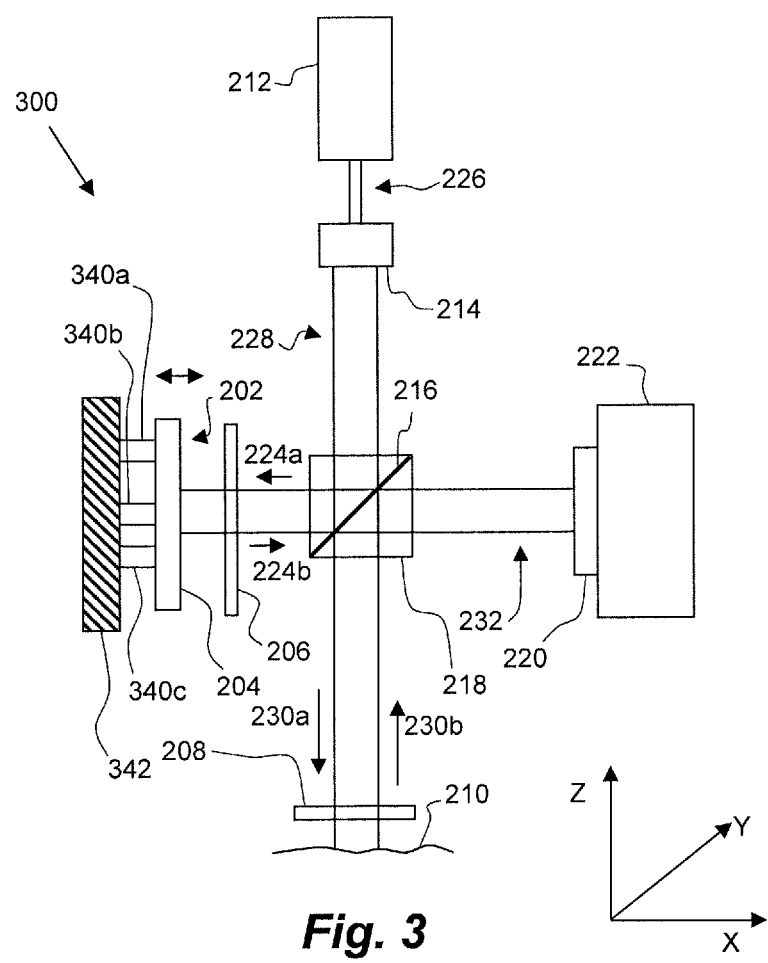
FIG. 3 is a schematic diagram showing an interferometry system with quarter wave plates and a moveable reference surface, in accordance with another exemplary embodiment of the present application.

FIG. 3 shows an interferometry system 300, in which the optical path length of the beams 224a, 224b can change in an oscillatory fashion when the reference surface 204 moves toward the beam splitter 218 and away from the beam splitter 218, while maintaining substantial perpendicularity to the beams 224a, 224b. A motion of the reference surface 204 of length x in the direction towards the beam splitter 218 causes the optical path length to decrease by 2×. Similarly, a motion of the reference surface 204 of x away from the beam splitter 218 causes the optical path length to increase by 2×. FIG. 3 illustrates an exemplary method of achieving this motion. In FIG. 3 the reference mirror 202 is attached to a substantially fixed, high mass object 342 via three piezoelectric transducers (PZTs) 340a, 340b, and 340c. PZTs 340a, 340b, and 340c are controlled by three high voltage amplifiers (not shown), and when the voltage across each PZT increases, the PZT changes length, moving the reference mirror 202 in a direction toward or away from the beam splitter 218, while maintaining perpendicularity to the beams 224a, 224b. When the voltage across a PZT returns to its original value, the length of the PZT returns to its original value. High voltage of the opposite polarity creates a change in the PZT length in the opposite direction. The three PZTs 340a, 340b, and 340c and their associated high voltage amplifiers are matched so as to maintain substantial perpendicularity to the beams 224a, 224b as the PZTs 340a, 340b, and 340c move the reference surface 204 toward the beam splitter 218 and away from it. The object 342 has very high inertial mass compared to the reference mirror 202, and as the PZTs 340a, 340b, and 340c move the reference mirror 202, substantially all of the motion is movement of the reference mirror 202 containing the reference surface 204, with substantially no motion of the fixed object 342. The thickness of the reference mirror 202, the material of the reference mirror 202, and the placement of the PZTs 340a, 340b, and 340c are chosen to avoid dynamic changes in flatness of the reference surface 204 as it moves toward the beam splitter 218 and away from it in response to excitation from the PZTs 340a, 340b, and 340c. Putting a beam expander (not shown) in the path of the beams 224a, 224b causes the beam diameter hitting the reference surface 204 to be smaller than the beam diameter of the beams 224a, 224b, allowing the reference mirror 202 to be smaller and have lower mass. Thus it is possible to move the reference mirror 202 back and forth more rapidly without requiring more powerful PZTs and without incurring significant dynamic distortion of the reference surface 204.

It is noted that any other suitable mechanisms of mounting the reference surface 204 and moving it in an oscillatory motion may be employed, such as using a single PZT and a flexure mount. As an example, the movement of the reference mirror 202 via a PZT can be accomplished by the model P-720 PZT, manufactured by Physik Instrumente, GmbH. Moreover, while the examples shown in FIGS. 3, 4 and 6 use a Michelson interferometer configuration, any other suitable interferometer configuration, including Mirau, Fizeau, Fabry-Perot, Twyman-Green, and Mach Zehnder, could also be used.

An alternative to moving the reference mirror 202 with the reference surface 204 is modulating the wavelength of the light source 212. In any of the illustrative embodiments disclosed herein, the oscillation of the wavelength of light can be substituted for the oscillatory motion of the reference mirror. Many techniques exist to modulate the wavelength of a coherent light source. One economical technique is to modulate the current of a laser diode, such as Sanyo DL6147, to produce wavelength modulation. If the path length of the reference beam differs by ΔL from the path length of the measurement beam, then a wavelength shift of Δλ of the light source 212 causes a phase shift of the interference fringe of $2\pi \Delta L \Delta \lambda / \lambda^2$. Signal processing can correct for the consequential effect of changes in light amplitude caused by modulating the laser diode current in order to modulate the wavelength.

An interferometry system in which the wavelength of the light beam 228 is modulated instead of moving the reference mirror 202 is described below with regard to FIG. 3. In such an interferometry system, because the reference mirror 202 is not moved, the PZTs 340a, 340b, and 340c, as well as the high mass object 342, may be omitted. Further, one of ordinary skill in the art will appreciate that the wavelength of the light beam 228 can be modulated by placing an optical component such as an acousto-optic modulator in the path of the light beam 226 emitted by the light source 212 or in the path of the light beam 228 produced by the beam expander 214, or by any other suitable technique.

Modulating the wavelength of the light beam 228 in sinusoidal fashion typically allows a higher modulation frequency than moving the reference mirror 202 and produces a system with no moving parts. Further, modulating the wavelength of the light beam 228 obviates the need for the high mass, substantially fixed object 342, reducing the mass of the total system. When using a laser diode as a light source, the change in intensity caused by modulating the diode current can be predicted or measured by a photo detector located near the laser diode, and the signal processing apparatus can correct for the change in light intensity of the laser diode.

In a first illustrative embodiment of the present application, a single point optical detector is used, the reference mirror moves continuously in sinusoidal motion, and the signal processing apparatus determines phase information by analyzing the output of the optical detector. Such an interferometer is useful for measuring changes in distance.

In a second illustrative embodiment of the present application, a two-dimensional optical detector is used, the reference mirror moves continuously back and forth in sinusoidal motion, or the wavelength of the light source changes in sinusoidal fashion, and the signal processing apparatus determines phase information by analyzing the output of each element of the optical detector. Phase information is converted to distance information by knowing the wavelength of light produced by light source 212. The image captured by the two-dimensional optical detector is equal to the physical size of the two-dimensional optical detector, reduced by the magnification of objective lens 220. To measure surfaces larger than one image size, it is necessary to move the measured surface in the X or Y direction, as appropriate, to a previously unmeasured area, wait for the stage motion and any associated vibration to settle, and capture an additional image. The process of moving to a new position, waiting for motion transients to settle, and then repeating the previous acquisition process is referred to as a "Step and Repeat" process. Additional images can be captured until the complete surface has been measured, up to the limit of the mechanical stage that moves the measured object. The edge of each additional image should either touch the previous image or overlap the previous image very slightly. The data from the additional image can be stitched to the original image via software.

Figure 4A:
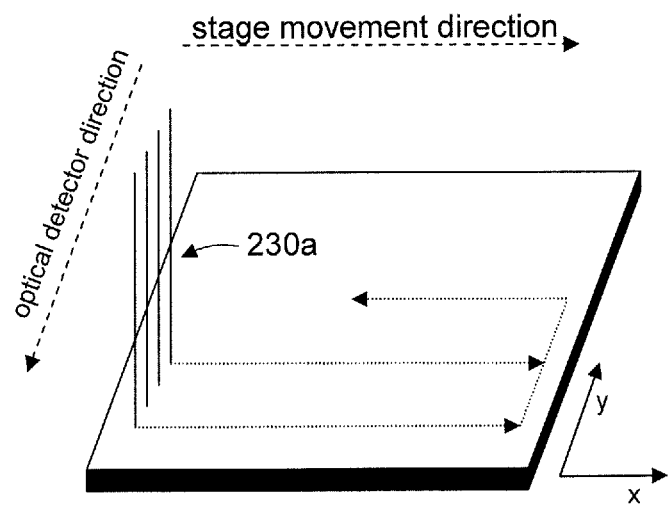
FIGS. 4a and 4b are diagrams showing the motions of a measured part with reference to a linear array of optical detector elements, in accordance with further exemplary embodiments of the present application.

In a third illustrative embodiment of the present application, the optical detector is a linear array of detector elements positioned for instance in the Y direction. The reference mirror moves continuously back and forth toward and away from the beam splitter in sinusoidal motion, or the wavelength of the light source changes in sinusoidal fashion, and the signal processing apparatus determines phase information by analyzing the output of each element of the optical detector. The sample moves in the X direction while image data are being acquired, as shown in FIG. 4a. The pixel size in the Y direction is equal to the physical size of a detector element divided by the magnification of objective lens 220. The pixel size in the X direction in this example is equal to the speed of sample movement in the X direction divided by the detection rate. The detection rate is dependent on both the frame rate of the optical detector and the signal processing technique used to detect phase changes. The maximum detection rate achievable is the frame rate, with some signal processing techniques achieving slower rates such as fps/2, fps/4, and fps/64, as are disclosed herein, where fps is an abbreviation for frames per second.

For example a sample moving at 1400 millimeters per second in the X direction and an optical detector sampling at 140,000 frames per second can produce a pixel size in the X direction of 10 microns, when using a signal processing technique that can detect phase information using only one frame of image data. The Y dimension of the image size created using this illustrative embodiment is equal to the physical length of the linear optical detector reduced by the magnification of objective lens 220. The X dimension of the image size created using this illustrative embodiment is equal to the X distance moved by the sample divided by the detection rate. To measure a surface of larger area, it is possible to perform a Step and Repeat operation, as previously described, and stitch together multiple images.

In this example, the measured surface is divided into many 10 micron by 10 micron pixels, so according to the Nyquist sampling theory it is possible to detect changes in surface topology having a spatial frequency of 1/(2*10 microns), or 50 cycles per millimeter. The amplitude of the topology variations that can be detected is dependent on the modulation frequency of the optical path length and the stage scan speed. In the case of using a HeNe laser source of wavelength 632 nm, modulating the reference mirror by 316 nm peak to peak, and using a camera sampling at 140,000 frames per second, the system can detect a maximum height difference of 316 nm from one pixel to the next in the Y-direction or between frames of the pixel in the X-direction.

The minimum required modulation frequency $\omega_r$ of the reference beam path length or the light source wavelength depends on the choice of demodulation technique, and the present application discloses four techniques, as follows, 1. Active mixing
2. Pseudo-active mixing
3. Multi-frequency analysis, and
4. Multi-frequency analysis via Phase Locked Loop.

Figure 5:
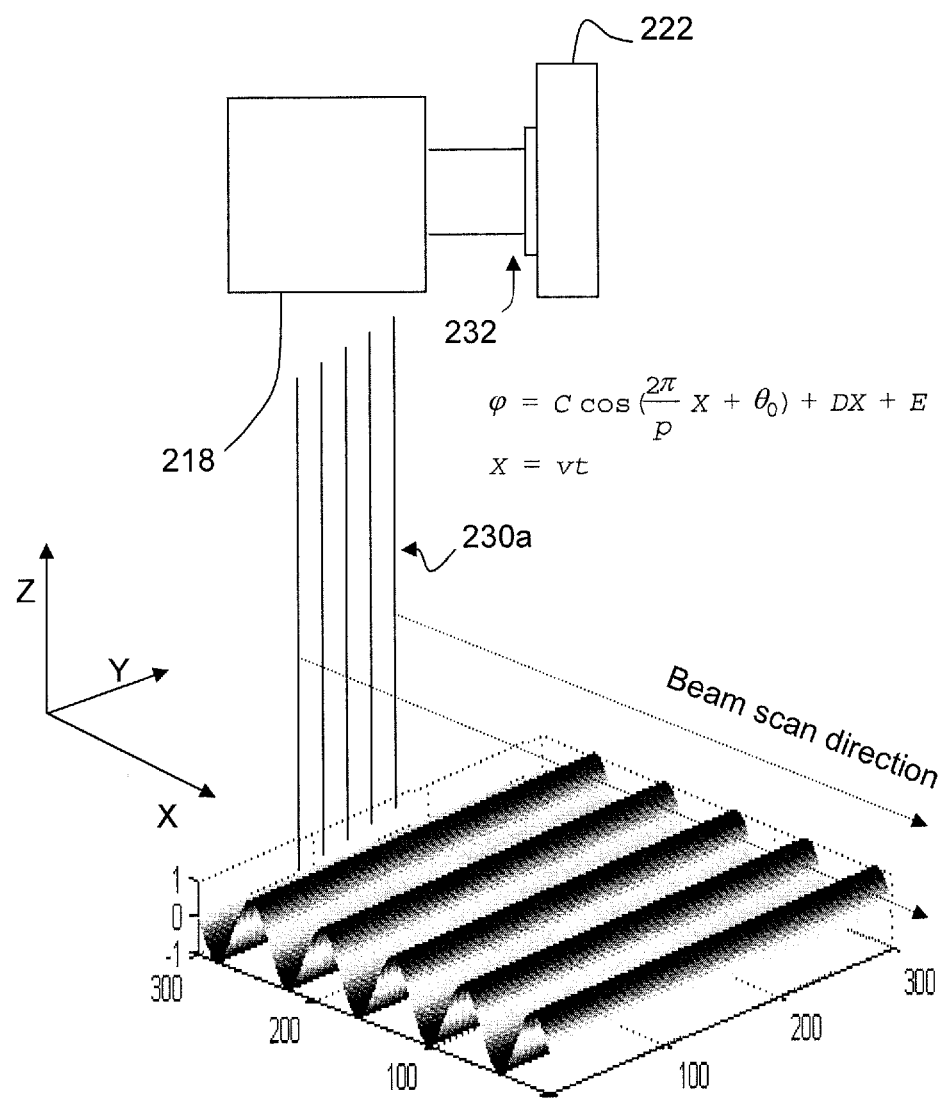
FIG. 5 is a diagram showing the measurement of a surface with high spatial frequency in one axis.

When using active mixing, pseudo-active mixing, or multi-frequency analysis (without phase locked loop) the minimum required modulation frequency $\omega_r$ is a function of the camera frame rate, the required surface profile spatial resolution, the speed of movement of the measured sample, and the profile accuracy. If the surface structure has a period of p in the X direction as shown in FIG. 5, the fringe phase that the jth pixel would see can be expressed as $$\varphi_j = C\cos\left(\frac{2\pi}{p}X + \theta_0\right) + DX + \varphi_0.$$

D is the deviation from absolute perpendicularity between the measurement beam and the average measured surface, $\theta_0$ is the offset of the phase, and $\phi_0$ is the offset of the $\omega_r$ modulation. In practice, when the measurement sample is aligned such that it is substantially perpendicular to the measurement beam, then D can be considered zero. When the beam position moves at a constant speed v, a plot of the phase output versus time is a cosine function. The faster the measured surface moves under the measurement beam the higher frequency of the output intensity signal. The modulation frequency can thus be expressed as $$\omega_r \gg \frac{d\varphi_j}{dt} = -C\frac{2\pi v}{p}\sin\left(\frac{2\pi v}{p}t + \theta_0\right) + Dv.$$

When signal processing incorporating a phase locked loop, such as the known method disclosed in U.S. Pat. No. 7,430,484, or any other suitable method is used, the minimum modulation frequency of $\omega_r$ can be 3-4 times lower for the same stage movement speed.

Figure 4B:
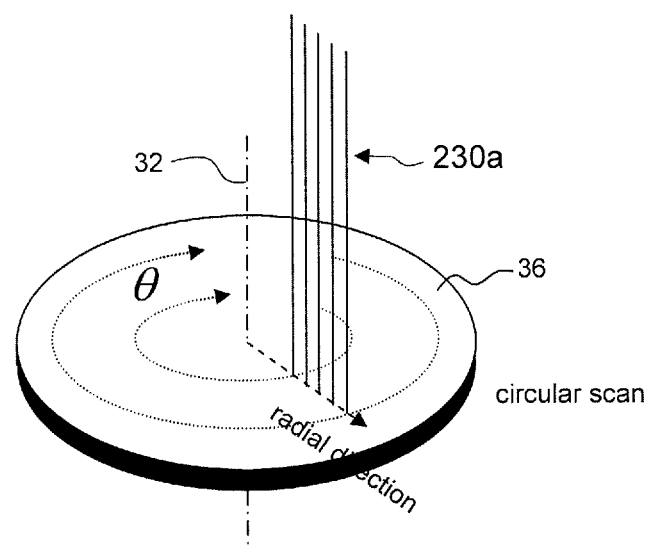

In a fourth illustrative embodiment of the present application, the optical detector is a linear array of optical detector elements positioned to look at the radial direction of a circular measured surface, as shown in FIG. 4b. For example, the linear array of optical detector elements and/or the circular measured surface can be configured to move relative to one another to allow the optical detector to perform a measurement along a radius of the measured surface. In accordance with the illustrative embodiment of FIG. 4b, the reference mirror moves continuously back and forth in sinusoidal motion, or the wavelength of the light source 212 is modulated in sinusoidal fashion, and the signal processing apparatus determines phase information by analyzing the output of each element of the optical detector. The measured object rotates about an axis 32 which passes through the center point of the measured object with the measured surface 36 substantially perpendicular to the measurement beam 230a. Image data are being acquired while the surface 36 is rotating. The pixel size in the radial direction is equal to the physical size of an optical detector element divided by the magnification of the objective lens 220. The pixel size in the theta direction is equal to the angular rotational speed of sample movement, times the radius of the pixel being measured, divided by the detection rate. While the size of a pixel in the theta direction is not constant due to the differing radii of each optical detector element, this difference can be readjusted later when presenting data. It is possible to acquire multiple images, in Step and Repeat fashion, by moving the linear array of optical detectors in the radial direction after acquiring an image of one complete revolution of the sample. The speed of rotation of the sample can be changed when acquiring different images in order to reduce the angular variation in pixel size and reduce the total measurement time.

Figure 6:
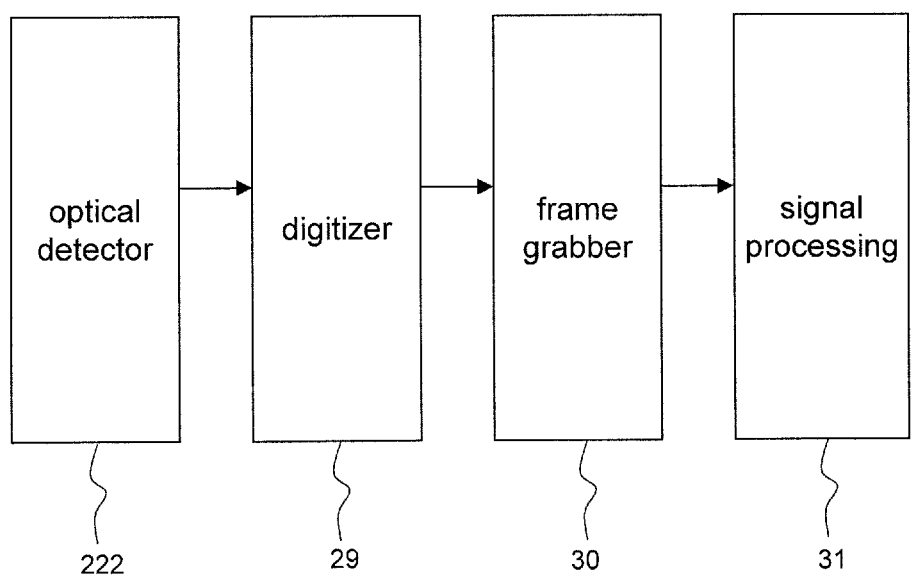
FIG. 6 is a block diagram showing a data path.

Referring to FIG. 6, the signals from each pixel in the optical detector 222 are captured, digitized by a digitizer 29, transferred to a frame grabber 30, and fed to a signal processing component 31, such as a GPU, a Field Programmable Gate Array (FPGA), or any other suitable signal processing component. Xilinx Spartan 3A DSP 1800A is an example of a suitable FPGA.

Some optical detectors include the capability to digitize the optical intensity of each pixel, and other optical detectors produce an analog output which must be digitized external to the optical detector.

All of the illustrative embodiments of the present application described above can measure distance in units of the average wavelength of light emitted from the light source 212. Unforeseen short-term changes in wavelength therefore create measurement errors. These errors, and similar errors such as might be caused by a change in the refractive index of air, can be avoided, as shown in FIG. 7.

Figure 7:
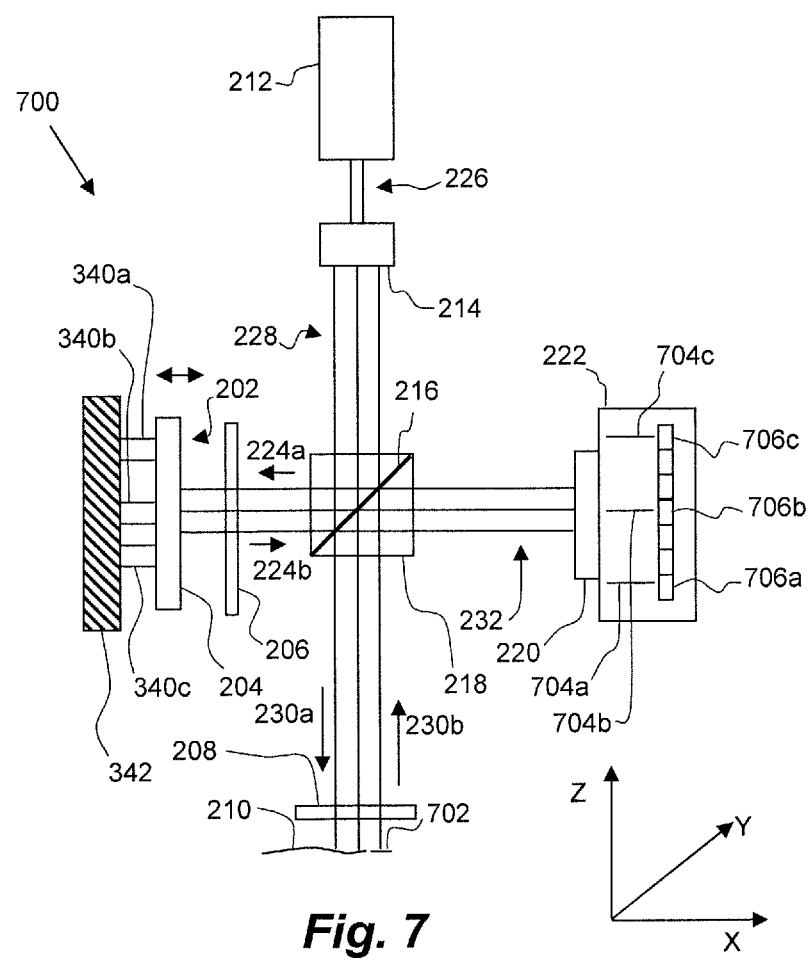
FIG. 7 is a schematic diagram showing a method of correcting systematic errors in collected data, in accordance with still another exemplary embodiment of the present application.

FIG. 7 shows an interferometry system 700, in which an additional optical detector element 706a can be positioned adjacent to optical detector elements 706b, 706c within the optical detector 222 previously described. Further, an additional fixed measured surface 702 can be positioned adjacent to the measured surface 210, such that the physical path length of the additional measured surface 702 does not change when the physical path length to the measured surface 210 changes. Changes in the phase of the intensity signal from each pixel of the measured surface, once converted to distance, can be multiplied by the ratio of the original phase of the pixel measuring the fixed surface to the current phase of the pixel measuring the fixed surface to compensate for change in wavelength or refractive index. This correction can be made in real time, because all pixel data are sampled at the same time, and the data are processed in parallel by the signal processor 31.

The optical configuration is shown in FIG. 7. The surface 702 is the fixed surface, and the surface 210 is the measured surface. The beam 230a is large enough to strike both the measured surface 210 and the fixed surface 702. The beam 230b is reflected by the partially mirrored surface 216 and then combined with the portion of reflected beam 224b that is transmitted through the partially mirrored surface 216. The combination of those beams, namely, the beam 232, enters the lens 220 and is expanded to become beams 704a, 704b, 704c. Specifically, the beam 704c is the ray of light at one side of a complete beam comprising beams 704a, 704b, 704c, the beam 704b is the ray at the center of the complete beam, and the beam 704a is the ray at the side of the complete beam opposite the beam 704c. The optical detector 222 in this example is a linear array of optical detector elements 706a, 706b, 706c. The beam 704c is detected by the optical detector element 706c, the beam 704b is detected by the optical detector element 706b, and the beam 704a is detected by the optical detector element 706a.

The waveform of the intensity for each pixel can be expressed as $I(x,y,t) = A(x,y) + B(x,y)\cos(\Delta\phi*\sin(\omega_r t) + \phi(x,y,t))$ where x and y represent the location of the position being measured, A is a DC signal offset which may vary from one measurement site to another, $\omega_r$ is the angular frequency of the modulation of the reference surface position or the wavelength, B is the intensity amplitude of the waveform, $\phi$ is the phase of the fringe pattern as a result of interference, and $\Delta\phi$ is the range of phase shift due to motion of the reference mirror. The DC offset term can be ignored, and the remainder of the equation can be represented by a Fourier series as follows.

$$I(x, y, t) = B(x, y)\cos(\Delta\varphi * \sin(\omega_r t) + \varphi(x, y, t)) = \qquad (1)$$
$$BJ_0(\Delta\varphi)\cos(\varphi) - 2B\sin(\varphi)\Sigma[J_{2m-1}(\Delta\varphi)\sin((2m-1)*\omega_r t)]$$
$$+ 2B\cos(\varphi)\Sigma[J_{2m}(\Delta\varphi)\cos(2m\omega_r t)] \qquad (2)$$

where the summation is from m=1 to ∞, $J_i(\Delta\phi)$ for i=0, 1, 2, ... are Bessel functions, and the DC signal offset term is omitted for simplicity. An exemplary method of measuring the phase φ of each pixel location is to calculate the arc tangent [α*SN(φ)/CS(φ)] at that location, where α is a constant dependent only on Δφ. The term SN(φ) is used as a short-hand for the demodulated result using odd harmonics in the output signals, I(x,y,t), such as −B sin(φ,x,y,t){$J_1$(Δφ)+ $J_3$(Δφ)+$J_5$(Δφ)+ . . . }. The constant gain −B{$J_1$(Δφ)+$J_3$(Δφ)+ $J_5$(Δφ)+ . . . } for sin(φ,x,y,t) could vary depending on the synthesized oscillator configuration. The term CS(φ) is used as a short-hand for the demodulated result using even harmonics signals, such as B cos(φ,x,y,t){$J_2$(Δφ)+$J_4$(Δφ)+$J_6$(Δφ)+ . . . }. Again, the constant gain for cos(φ,x,y,t) could vary depending on the synthesized oscillator configuration. Therefore once these terms SN(φ) and CS(φ) are obtained for each pixel X,Y position, the distance Z at each pixel can be calculated. With this exemplary method, the noise spectrum outside of the fringe oscillation frequency and its harmonics is effectively eliminated by a phase synchronous detection technique, while the measurement range can be well beyond the fringe period.

Similar waveforms produced by position encoders are known. Further, methods of calculating position information from such output signals are also known, e.g., by using a probe or a sensor that moves in a sinusoidal motion parallel to a grating surface and substantially perpendicular to the direction of the grating stripes, as disclosed in U.S. Pat. Nos. 5,589,686, 5,744,799, 6,639,686, and 7,430,484, which are incorporated herein by reference in their entirety.

Figure 8A:
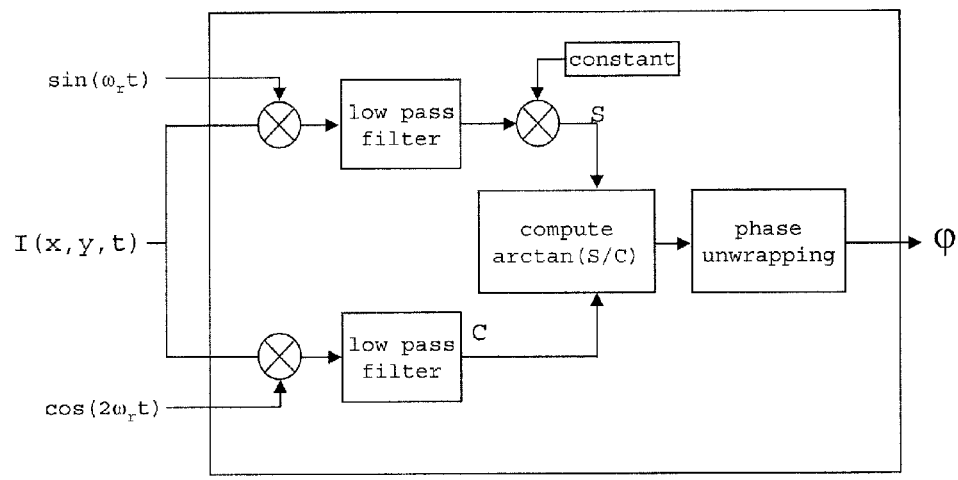
FIGS. 8a and 8b are block diagrams illustrating overviews of the data processing done by a signal processing component.

The signal processing shown in FIG. 8a determines phase φ of the intensity signal by calculating sin(φ) and cos(φ) and taking the arc tangent. Multiplying the intensity signal I(x,y,t) by cos(2$\omega_r$t) and filtering through a low pass filter creates the coefficient for m=1, ½*B cos(φ)$J_2$(Δφ). Similarly, multiplying the intensity signal I(x,y,t) by sin($\omega_r$t) and filtering through a low pass filter creates the coefficient for m=1, ½*B sin(φ)$J_1$(Δφ).

$$\phi = \arctan(J_1(\Delta\phi)/J_2(\Delta\phi) * [\tfrac{1}{2}*B \cos(\phi)J_2(\Delta\phi)]/[\tfrac{1}{2}*B \sin(\phi)J_1(\Delta\phi)])$$

Sin(φ) in the Fourier series of equation 2 has a coefficient of 2B*Σ[$J_{2m−1}$(Δφ)sin((2m−1)*$\omega_r$t)], and cos(φ) has a coefficient of 2B*Σ[$J_{2m}$(Δφ)cos(2m$\omega_r$t)]. The constant shown in FIG. 8a is the ratio of the cos(φ) coefficient divided by the sin(φ) coefficient. The arc tangent function can be computed via a look-up table, a numerical processing algorithm, or any other suitable technique.

The output of the arc tangent computation is φ, which can be converted to a distance by multiplying by $$\frac{\lambda}{4\pi}.$$

The actual measured distance is φ+nλ, where n is an integer. The process of determining the value of n is referred to as "phase unwrapping". Phase unwrapping is done by comparing the distance measured at one pixel to neighboring pixels and picking a value of n such that the difference between a pixel and its neighbor is less than λ/2.

Figure 8B:
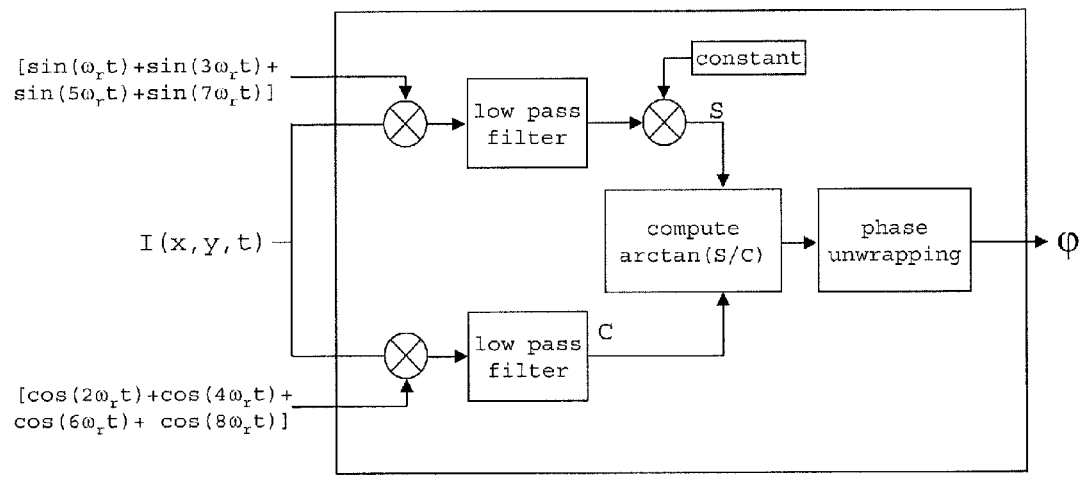

Multiplying the I(x,y,t) signal by cos(4$\omega_r$t) and sin(3$\omega_r$t) creates the coefficients of sin(φ) and cos(φ) for the case of m=2, and adding the coefficient for m=1 to the coefficient for m=2 before computing the arc tangent creates an improved determination of φ. Computing the coefficients of sin(φ) and cos(φ) using additional values of m creates a better determination of φ. FIG. 8b shows how the signal processing would determine φ using m=1 through m=4, inclusive.

Alternatively, a pseudo-phase-locked loop (PLL) can be used to create an estimate of the phase φ, $\hat{\phi}$, and to compute cos($\hat{\phi}$)sin(n$\omega_r$t), where n is an odd integer, and sin($\hat{\phi}$)cos (m$\omega_r$t), where m is an even integer, and multiply-add the incoming intensity signal I(x,y,t) by the synthesized functions with the estimated quadrature components, for example, as described in U.S. Pat. No. 7,430,484. The PLL constantly adjusts the estimate of phase $\hat{\phi}$ so that sin(φ−$\hat{\phi}$) is zero, and determines the reference mirror oscillation amplitude Δφ rather than requiring Δφ as an input, thereby eliminating errors caused by variation in or an inaccurate value of Δφ, the reference mirror oscillation amplitude.

In the second, third, and fourth illustrative embodiments of the present application described above, the data for all optical detector elements are processed in substantially real time, in parallel. This may be done either via multiple processor cores or preferably by an FPGA (Field Programmable Gate Array), a GPU (Graphics Processing Unit), or an ASIC (Application Specific Integrated Circuit) utilizing pipe-lined signal processing, in which the same hardware quickly processes an intensity datum from one optical detector element and then processes an intensity datum from the next optical detector element by transferring the output from each node to the next processing node at each clock cycle of the processor, producing fully processed intensity data at a rate that can be as fast as the rate that data are captured by the optical detector with a delay of only a few clock cycles of the pipe-line.

Figure 9:
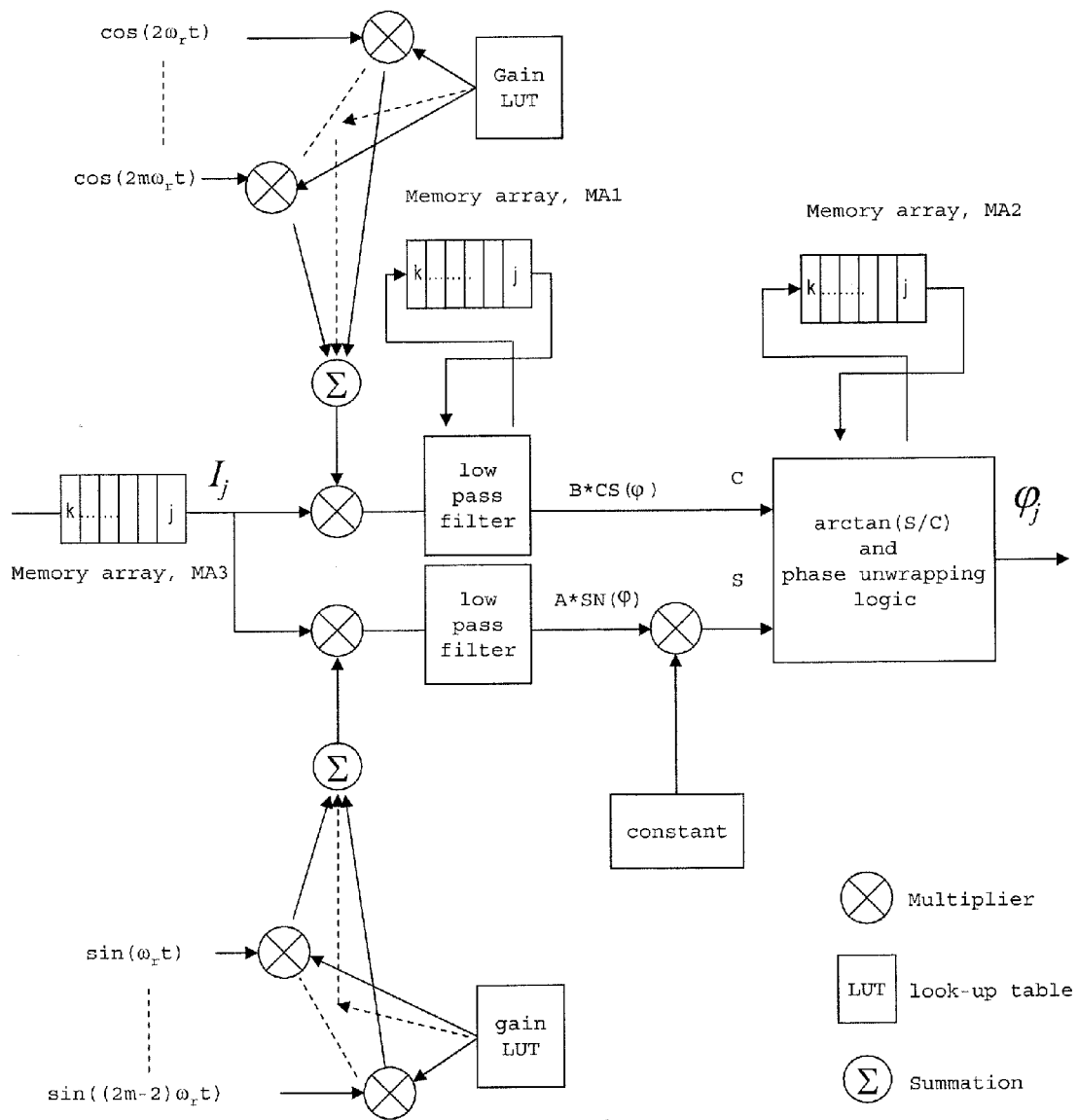
FIG. 9 is a schematic diagram showing an illustrative example of pipe-lining.

FIG. 9 shows an exemplary signal processing flow using pipe-lining, although variations are possible. Intensity information $I_j$ coming out of the camera, where j refers to the row j of the linear optical detector array in the third illustrative embodiment is fed into the processor core through the memory array, MA3 at every clock cycle. Each sine and cosine signal is multiplied by an appropriate gain, which is determined from a look-up table. All the cosine terms and all the sine terms are added. When the jth pixel data is multiplied by the synthesized multi-frequency signals, the result is fed into a low pass filter at the next processor clock cycle in order to derive A*SN(φ) and B*CS(φ), where A and B are constants. While this is happening, processing of the next intensity signal starts at the previous functional node. The low pass filters have a few intermediate states which correspond to a pixel position. Such states are stored in FIFO-like memory MA1, and are later restored immediately before the next corresponding pixel operation is executed. The intermediate result from the lower signal path is then multiplied by the constant depending on the gain matrix inside Gain LUT. The last signal processing core first calculates arc tangent(S/C). The arc tangent function creates an output φ, whereas what is needed is φ+nπ where n is an integer, such that the difference in phase between the current pixel and the same pixel in the next frame is less than π, in order to guaranty continuity. This process of phase unwrapping is the last step in the signal process flow shown in FIG. 9. Each phase measurement result is stored in memory array MA2 and is later compared with the arc tangent output at the same pixel position at the next frame. If the difference is more than π, the latest phase measurement result is readjusted by ±π depending on the surface profile until the absolute phase difference becomes less than π.

Alternatively, the PLL signal processing method disclosed in U.S. Pat. No. 7,430,484 can be used for pipe-lined processing. Use of this technique creates automatic phase unwrapping, as the input to the numerical integrator in the feedback loop constantly shows the phase being measured and automatically maintains continuity as the measured phase changes.

Pipe-lining makes it economically feasible to process all data from the optical detector elements in real time, even when there are millions of pixels in the image. Further, the processing techniques described in the above listed U.S. patents allow resolution of phase measurement equivalent to one part in 2^18. Thus the Z-axis resolution of the measurement when using a Michelson interferometer and light of 632 nm wavelength is 1.2 pm.

The signal processing method described thus far is referred to as a "multi-frequency" analysis method. This method requires a good digital representation of the input signal I(x,y,t). Typically 64 or more samples per period of path length modulation frequency $\omega_r$ are required, especially when analyzing higher order harmonics. Providing 64 samples via an optical detector array such as a CCD camera requires 64 frames of data. In the second, third, and fourth illustrative embodiments described above, the measured object is moving during data acquisition and therefore the effective pixel dimension in the direction of movement equals the distance traveled divided by the effective frame rate, which has been referred to as the "detection rate".

Making the detection rate 1/64 the camera frame rate limits the total measurement speed. This problem can be addressed by avoiding the initial multiplication of the digitized intensity waveform shown in FIGS. 8a and 8b. Employing a light intensity modulator 1202 (see FIG. 12) to modulate the physical light intensity of the light source 212 (see also FIG. 12) by $\sin(\omega_r t)$, with the light modulation frequency, $\omega_r$, synchronous with the camera frame rate, produces a signal with the same information as multiplying the intensity signal I(x,y,t) produced using a light source of constant intensity by $\sin(\omega_r t)$. Similarly, employing the light intensity modulator 1202 to modulate the physical light intensity of the light source 212 by $\cos(2\omega_r t)$ produces a signal with the same information as multiplying the intensity signal I(x,y,t) produced using a light source of constant intensity by $\cos(2\omega_r t)$.

Figure 10:
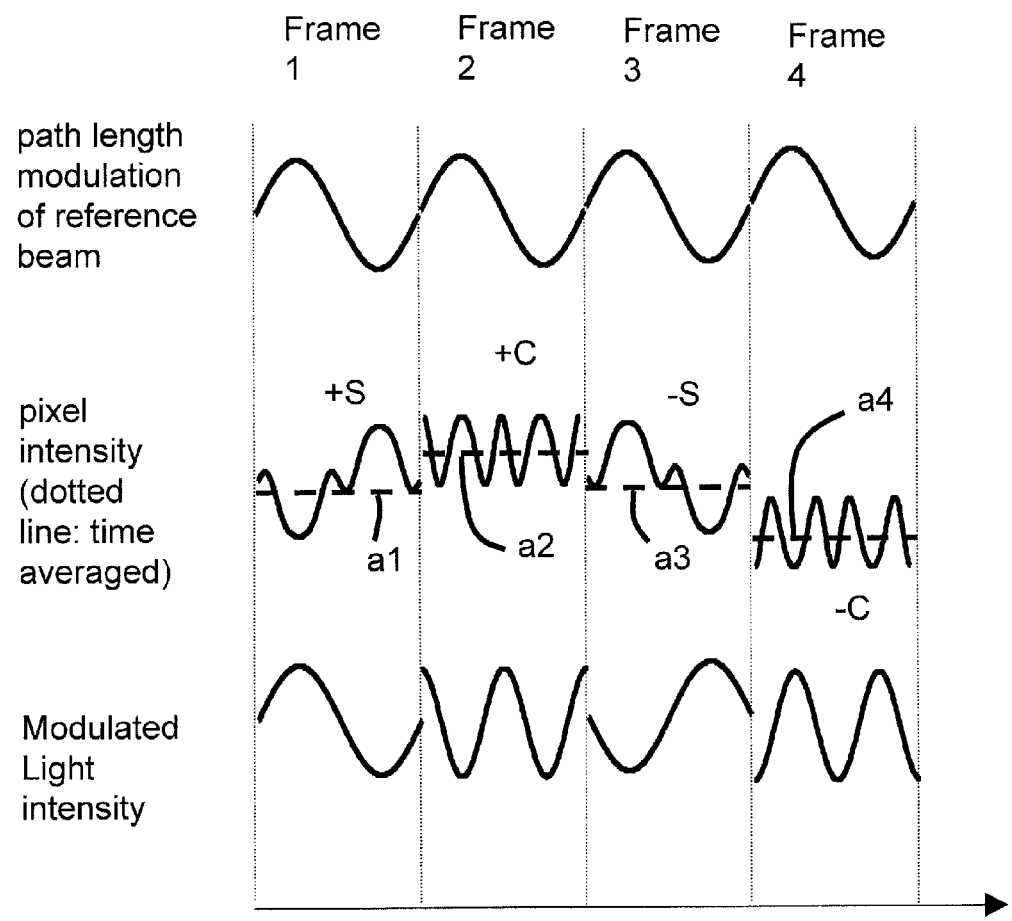
FIG. 10 is a series of plots showing the signals in an active mixing signal processing technique.

When multiplication is done digitally it is possible to multiply the intensity signal I(x,y,t) by $\sin(\omega_r t)$ and also by $\cos(2\omega_r t)$ and produce two outputs at the same time. When modulating the physical light intensity rather than the intensity signal I(x,y,t), the physical light intensity can only be modulated by a single waveform. Since it is necessary to obtain both $\sin(\phi)$ and $\cos(\phi)$ information one can modulate the physical light intensity by $\sin(\omega_r t)$ for one cycle, modulate the physical light intensity by $\cos(2\omega_r t)$ for the next cycle, repeat the sequence, combine information obtained from different cycles to obtain the $\sin(\phi)$ and $\cos(\phi)$, and compute the arc tangent[$\sin(\phi)/\cos(\phi)$] (see FIG. 12, reference numeral 1208). Since the sine and cosine functions include both positive and negative values, the intensity signal is actually modulated by [1+$\sin(\omega_r t)$] and [1+$\cos(2\omega_r t)$], and the DC level is removed during signal processing. FIG. 10 shows one example of waveforms produced when modulating the physical light intensity in this manner.

Define +S as the photon signal arriving at the optical detector 222 (see FIG. 12) during one cycle of path length modulation of frequency $\phi_r$ when the physical light intensity is modulated by $\sin(\phi_r t)$. Define +C as the photon signal arriving at the optical detector 222 during one cycle of path length modulation of frequency $\phi_r$ when the physical light intensity is modulated by $\cos(2\phi_r t)$, which in this example is during the second modulation cycle. During the third cycle, −S is obtained when the physical light intensity is modulated by $-\sin(\phi_r t)$. During the fourth cycle, −C is obtained when the physical light intensity is modulated by $-\cos(2\phi_r t)$. The sequence then repeats, with the fifth cycle being the same as the first, the sixth cycle being the same as the second, etc.

Define d as the DC offset of the pixel intensity signal caused by the fact that the physical light intensity was modulated by [1+$\sin(\phi_r t)$] rather than by [$\sin(\phi_r t)$] and [1+$\cos(2\phi_r t)$] rather than [$\cos(2\phi_r t)$]. The optical detector 222 (such as a CCD camera) integrates the incoming photons within a finite time window per frame. This integration performs a function equivalent to the low pass filter of FIG. 8a or 8b. As a result, the integration operation of the optical detector 222 (see FIG. 12) denoted as <> below, provides the output signals of a1, a2, a3, and a4 shown in FIG. 10 during each frame as follows (see also FIG. 12, reference numeral 1204).

$$a1 = <+S+d> \tag{3}$$

$$a2 = <+C+d> \tag{4}$$

$$a3 = <-S+d> \tag{5}$$

$$a4 = <-C+d> \tag{6}$$

Figure 12:
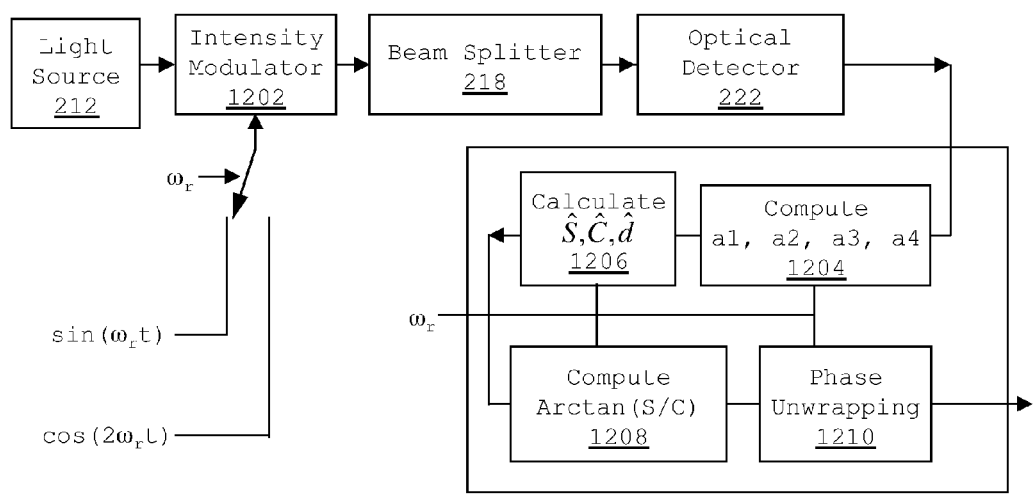
FIG. 12 is a block diagram illustrating an overview of further data processing done by a signal processing component.

Although it requires four periods of reference mirror modulation of frequency $\phi_r$ to acquire +S, −S, +C, and −C values, after acquiring data for four frames, a new estimate of S, indicated by the letter S with the mark ^ over it, can be computed after each successive odd numbered frame, and a new estimate of C, indicated by the letter C with the mark ^ over it, can be computed after each successive even numbered frame (see FIG. 12, reference numeral 1206).

$$\hat{S} = (a1-a3)/2, \tag{7}$$

$$\hat{C} = (a2-a4)/2, \tag{8}$$

$$\hat{d} = (a1+a3)/2 \text{ or } \hat{d} = (a2+a4)/2 \tag{9}$$

Although the modulation of the physical light intensity when doing active mixing is synchronous with the motion of the reference mirror, the discontinuity in the intensity signal that may be produced when switching instantaneously from $\sin(\phi_r t)$ to $\cos(2\phi_r t)$ modulation may create an error in the CCD image. Further, a CCD or CMOS camera may not integrate photons over 100% of the period of the frame rate, causing an additional error source. In order to avoid these error sources, one can modulate the path length multiple cycles per frame and leave one cycle out, which overlaps with the camera non-integration zone, from photon integration by keeping the modulated physical light intensity zero during the cycle. This lowers the sensitivity of the camera somewhat in order to avoid these error sources.

The physical light intensity of the light source 212 (see FIG. 12), such as a constant intensity laser light source, can be modulated via the light intensity modulator 1202 (see also FIG. 12), such as an acousto-optic modulator or any other suitable mechanism or technique, as known in the art. Such an intensity modulator generally adds cost to the interferometer, but the increased speed of measurement may justify the added cost as this signal processing technique achieves an effective frame rate of fps or fps/2 rather than for instance fps/64.

Figure 11:
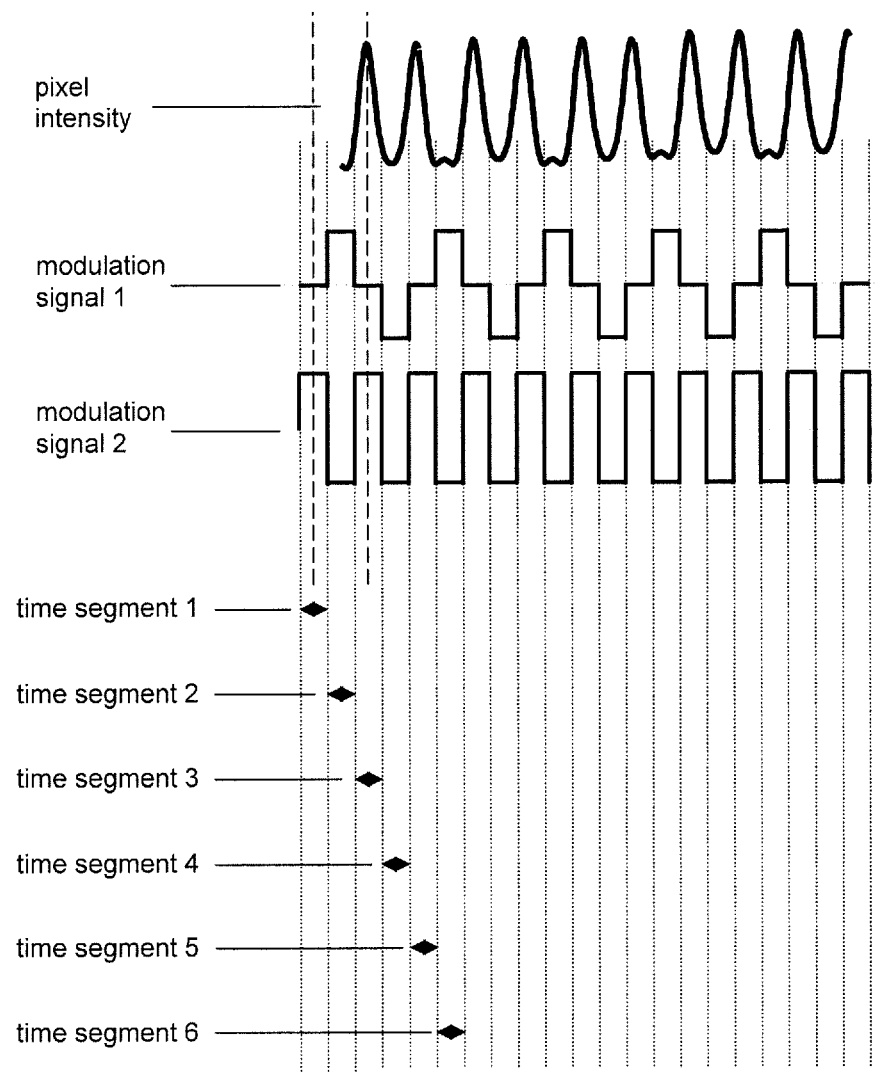
FIG. 11 is a series of plots showing the signals in a pseudo-active mixing signal processing technique.

Another technique, referred to as "pseudo-active mixing", can acquire data at an effective maximum rate of fps/4 and does not require modulating the intensity of the light source. FIG. 11 shows signals in the pseudo-active mixing process. Here, the frame capture timing and the path length modulation timing is aligned such that the integral of the path length modulation signal over time period 1 is zero. Sin($\phi$)

is obtained by multiplying the intensity signal by modulation signal 1, and cos(φ) is obtained by multiplying the intensity signal by modulation signal 2. There is no real multiplication because modulation signals 1 and 2 take on values of only +1, −1, and 0. Thus the processing hardware required is considerably simpler. The result of multiplying the intensity signal by modulation signal 1 consists of the camera intensity output created at the end of time segment 2 minus the camera intensity output created at the end of time segment 4. The result of multiplying the camera intensity signal by modulation signal 2 consists of alpha times the quantity [the camera intensity output created at the end of time segment 1 minus the camera intensity output created at the end of time segment 2 plus the camera intensity output created at the end of time segment 3 minus the camera intensity output created at the end of time segment 4], where alpha is a constant. After 4 frames of camera information it is possible to calculate the phase. After time segment 5 it is desirable to re-calculate phase using the camera outputs from time segments 2-5. The process is repeated in pipe-lined fashion producing a new phase estimate after each camera frame, with the estimate based on the four most recent camera frames.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. An interferometer, comprising:
    a beam splitter operative to split a source light beam into a reference beam and a measurement beam, the reference beam for striking a reference surface, and the measurement beam for striking a measurement sample;
    one-dimensional array of optical detector elements operative to receive a combination of light beams reflected from the reference surface and the measurement sample, respectively, and to detect interference fringes resulting from the combination of light beams, the one-dimensional array of optical detector elements being operative to detect an intensity signal, $l(x,y,t)$, corresponding to an intensity of at least a portion of the combination of light beams at a pixel position, x,y, and at a time, t;
    a modulator operative to modulate a wavelength of the source light beam at a predetermined sinusoidal frequency, $\omega_r$; and
    signal processing means including at least arctangent logic means and phase unwrapping logic means, the signal processing means being operative:
        to compute, by the arctangent logic means, an arctangent of a quotient of a first signal, $\alpha I(x,y,t)\sin(\omega_r t)$, divided by a second signal, $I(x,y,t)\cos(2\omega_r t)$, wherein "α" is a predetermined constant, and wherein the computed arctangent corresponds to one or more phases of the interference fringes; and
        to unwrap, by the phase unwrapping logic means, the one or more phases of the interference fringes to obtain one or more physical distances relative to the measurement sample.

2. The interferometer of claim 1 wherein the one-dimensional array of optical detector elements is configured to be positioned substantially perpendicular to a direction of linear movement of the measurement sample, and to perform a measurement on the measurement sample by collecting intensity data while the measurement sample moves in the predetermined linear direction of movement.

3. The interferometer of claim 1 wherein the measurement sample is substantially circular, and wherein the one-dimensional array of optical detector elements is configured to perform a measurement on the measurement sample by collecting intensity data along a radius of the measurement sample during rotational movement of the measurement sample.

4. An interferometer, comprising:
    a light intensity modulator operative:
        to modulate a light intensity of a source light beam by $\sin(i*\omega_r t)$ for k periods of a predetermined sinusoidal frequency, $\omega_r$, to obtain a first modulated signal; and
        to modulate the light intensity of the source light beam by $\cos(j*\omega_r t)$ for k periods of the predetermined sinusoidal frequency, $\omega_r$, to obtain a second modulated signal, wherein "i" is an odd integer, wherein "j" is an even integer, and wherein "k" is a positive integer;
    a beam splitter operative to split the intensity modulated source light beam into a reference beam for striking a reference surface, and a measurement beam for striking a measurement sample, wherein a light beam reflected from the reference surface has an optical path length that is measurable in wavelengths of the reference beam;
    an optical detector operative to receive a combination of light beams reflected from the reference surface and the measurement sample, respectively, and to detect interference fringes resulting from the combination of light beams, the optical detector having at least one optical detecting element operative to detect an intensity signal, $I(x,y,t)$, corresponding to an intensity of at least a portion of the combination of light beams at a pixel position, x,y, and at a time, t, wherein the first modulated signal is expressed as $\alpha I(x,y,t)\sin(\omega_r t)$, wherein the second modulated signal is expressed as $I(x,y,t)\cos(2\omega_r t)$ and wherein "α" is a predetermined constant;
    a light wavelength modulator operative to modulate the optical path length of the light beam reflected from the reference surface at the predetermined sinusoidal frequency, $\omega_r$, by modulating a wavelength of the source light beam at the predetermined sinusoidal frequency, $\omega_r$; and
    signal processing means including at least arctangent logic means and phase unwrapping logic means,
    wherein the arctangent logic means is operative to compute an arctangent of a quotient of the first modulated signal divided by the second modulated signal, the computed arctangent corresponding to one or more phases of the interference fringes, and
    wherein the phase unwrapping logic means is operative to unwrap the one or more phases of the interference fringes to obtain one or more physical distances relative to the measurement sample.

5. The interferometer of claim 4 wherein the light intensity modulator is an acousto-optic modulator.

6. An interferometer, comprising:
    a beam splitter operative to split a source light beam into a reference beam for striking a reference surface, and a measurement beam for striking a measurement sample, wherein the reference beam has an optical path length that is measurable in wavelengths of the reference beam;
    an optical detector operative to receive a combination of light beams reflected from the reference surface and the measurement sample, respectively, and to detect interference fringes resulting from the combination of light beams, wherein the optical detector has at least one optical detecting element operative to detect an intensity signal, I(x,y,t), corresponding to an intensity of at least a portion of the combination of light beams at a pixel position, x,y, and at a time, t, wherein the optical detector has an associated frame rate, and wherein "φ" represents one or more phases of the interference fringes;

a modulator operative to modulate a wavelength of the source light beam at a predetermined sinusoidal frequency, ($\omega_r$, that is synchronous with the frame rate of the optical detector, thereby modulating the optical path length measurable in wavelengths of the reference beam; and signal processing means operative:
  to calculate a sine of φ by applying a first predetermined modulation signal to the intensity signal, I(x,y,t), the first predetermined modulation signal being periodic and having values of 0, 1, 0, and −1 during four consecutive time segments, each of the four consecutive time segments corresponding to a modulation period of the optical path length of the reference beam;
  to calculate a cosine of φ by applying a second predetermined modulation signal to the intensity signal, I(x,y,t), the second predetermined modulation signal being periodic and having values of 1, −1, 1, and −1 during the four consecutive time segments;
  to obtain the one or more phases, φ of the interference fringes from the sine of φ and the cosine of φ; and
  to unwrap the one or more phases, φ, of the interference fringes to obtain one or more physical distances relative to the measurement sample.

7. A method of operating an interferometer, comprising:
splitting, by a beam splitter, a source light beam into a reference beam and a measurement beam, the reference beam for striking a reference surface, and the measurement beam for striking a measurement sample;
receiving, at a one-dimensional array of optical detector elements, a combination of light beams reflected from the reference surface and the measurement sample, respectively;
detecting, by the one-dimensional array of optical detector elements, interference fringes resulting from the combination of light beams, the detecting of the interference fringes including detecting, by the one-dimensional array of optical detector elements, an intensity signal, I(x,y,t), corresponding to an intensity of at least a portion of the combination of light beams at a pixel position, x,y, and at a time, t, wherein a light beam reflected from the reference surface has an optical path length that is measurable in wavelengths of the reference beam;
modulating, by a modulator, a wavelength of the source light beam at a predetermined sinusoidal frequency, $\omega_r$, thereby modulating the optical path length of the light beam reflected from the reference surface at the predetermined sinusoidal frequency, $\omega_r$;
computing, by arctangent logic means, an arctangent of a quotient of a first signal, αI(x,y,t)sin($\omega_r$t), divided by a second signal, I(x,y,t)cos(2$\omega_r$t) "α" being a predetermined constant, the computed arctangent corresponding to one or more phases of the interference fringes; and unwrapping, by phase unwrapping logic means, the one or more phases of the interference fringes to obtain one or more physical distances relative to the measurement sample.

8. The method of claim 7 further comprising:
moving the measurement sample in a predetermined linear direction of movement;
positioning the one-dimensional array of optical detector elements substantially perpendicular to the predetermined linear direction of movement of the measurement sample; and
performing, by the one-dimensional array of optical detector elements, a measurement on the measurement sample by collecting intensity data while moving the measurement sample in the predetermined linear direction of movement.

9. The method of claim 7 wherein the measurement sample is substantially circular, wherein the measurement sample has a radius, and wherein the method further comprises:
rotationally moving the measurement sample; and
performing, by the one-dimensional array of optical detector elements, a measurement on the measurement sample by collecting intensity data along the radius while rotationally moving the measurement sample.

10. A method of operating an interferometer, comprising:
modulating a physical light intensity of a source light beam by sin(i*$\omega_r$t) for k periods of a predetermined sinusoidal frequency, $\omega_r$, to obtain a first modulated signal, "i" being an odd integer, "j" being an even integer, and "k" being a positive integer;
modulating the physical light intensity of the source light beam by cos(j*$\omega_r$t) for k periods of the predetermined sinusoidal frequency, $\omega_r$, to obtain a second modulated signal;
splitting, by a beam splitter, the intensity modulated source light beam into a reference beam and a measurement beam, the reference beam for striking a reference surface, and the measurement beam for striking a measurement sample, a light beam reflected from the reference surface having an optical path length that is measurable in wavelengths of the reference beam;
receiving, at an optical detector, a combination of light beams reflected from the reference surface and the measurement sample, respectively;
detecting, by the optical detector, interference fringes resulting from the combination of light beams, including detecting, by at least one optical detecting element, an intensity signal, I(x,y,t), corresponding to an intensity of at least a portion of the combination of light beams at a pixel position, x,y, and at a time, t, the first modulated signal being expressed as αI(x,y,t)sin($\omega_r$t), the second modulated signal being expressed as I(x,y,t)cos(2$\omega_r$t), and "α" being a predetermined constant;
modulating, at the predetermined sinusoidal frequency, $\omega_r$, the optical path length of the light beam reflected from the reference surface;
computing, by arctangent logic means, an arctangent of a quotient of the first modulated signal divided by the second modulated signal, the computed arctangent corresponding to one or more phases of the interference fringes; and
unwrapping, by phase unwrapping logic means, the one or more phases of the interference fringes to obtain one or more physical distances relative to the measurement sample.

11. The method of claim 10 wherein the source light beam has an optical path, wherein the method further comprises:
placing an acousto-optic modulator in the optical path of the source light beam,
wherein the modulating of the physical light intensity of the source light beam by $\sin(i*\omega_r t)$ for k periods of the predetermined sinusoidal frequency, $\omega_r$, includes modulating the physical light intensity of the source light beam using the acousto-optic modulator; and
wherein the modulating of the physical light intensity of the source light beam by $\cos(j*\omega_r t)$ for k periods of the predetermined sinusoidal frequency, $\omega_r$, includes modulating the physical light intensity of the source light beam using the acousto-optic modulator.

12. A method of operating an interferometer, comprising:
splitting, by a beam splitter, a source light beam into a reference beam for striking a reference surface, and a measurement beam for striking a measurement sample, the reference beam having an optical path length that is measurable in wavelengths of the reference beam;
receiving, at an optical detector, a combination of light beams reflected from the reference surface and the measurement sample, respectively;
detecting, by the optical detector, interference fringes resulting from the combination of light beams, including detecting, by at least one optical detecting element, an intensity signal, I(x,y,t), corresponding to an intensity of at least a portion of the combination of light beams at a pixel position, x,y, and at a time, t, the optical detector having an associated frame rate, and "$\phi$" representing one or more phases of the interference fringes;
modulating the optical path length of the light beam reflected from the reference surface at a predetermined sinusoidal frequency, $\omega_r$, that is synchronous with the frame rate of the optical detector;
calculating, by signal processing means, a sine of $\phi$ by applying a first predetermined modulation signal to the intensity signal, I(x,y,t), the first predetermined modulation signal being periodic and having values of 0, 1, 0, and −1 during four consecutive time segments, the four consecutive time segments each corresponding to a modulation period of the optical path length of the reference beam;
calculating, by the signal processing means, a cosine of $\phi$ by applying a second predetermined modulation signal to the intensity signal, I(x,y,t), the second predetermined modulation signal being periodic and having values of 1, −1, 1, and −1 during the four consecutive time segments;
obtaining, by the signal processing means, the one or more phases, $\phi$, of the interference fringes from the sine of $\phi$ and the cosine of $\phi$; and
unwrapping, by the signal processing means, the one or more phases, $\omega$, of the interference fringes to obtain one or more physical distances relative to the measurement sample.

13. A method of operating an interferometer, comprising:
splitting, by a beam splitter, a source light beam into a reference beam and a measurement beam, each of the reference beam and the measurement beam having an optical path and an optical path length;
transmitting the measurement beam through a measurement sample in the optical path of the measurement beam;
receiving, at a one-dimensional array of optical detector elements, a combination of the reference beam and the measurement beam transmitted through the measurement sample;
detecting, by the one-dimensional array of optical detector elements, interference fringes resulting from the combination of beams, the detecting of the interference fringes including detecting an intensity signal, I(x,y,t), corresponding to an intensity of at least a portion of the combination of beams at a pixel position, x,y, and at a time, t;
modulating, by a modulator, a wavelength of the source light beam at a predetermined sinusoidal frequency, $\omega_r$;
computing, by arctangent logic means, an arctangent of a quotient of a first signal, $\alpha I(x,y,t)\sin(\omega_r t)$, divided by a second signal, $I(x,y,t)\cos(2\omega_r t)$ "$\alpha$" being a predetermined constant, the computed arctangent corresponding to one or more phases of the interference fringes, and
unwrapping, by phase unwrapping logic means, the one or more phases of the interference fringes to obtain one or more physical distances relative to the measurement sample.

14. The method of claim 13 further comprising:
moving the measurement sample in a predetermined linear direction of movement;
positioning the one-dimensional array of optical detector elements substantially perpendicular to the predetermined linear direction of movement of the measurement sample; and
performing, by the one-dimensional array of optical detector elements, a measurement on the measurement sample while moving the measurement sample in the predetermined linear direction of movement.

15. The method of claim 13 wherein the measurement sample is substantially circular, wherein the measurement sample has a radius, and wherein the method further comprises:
rotationally moving the measurement sample; and
performing, by the one-dimensional array of optical detector elements, a measurement on the measurement sample along the radius while rotationally moving the measurement sample.

16. A method of operating an interferometer, comprising:
modulating, by a light intensity modulator, a light intensity of a source light beam by $\sin(i*\omega_r t)$ for k periods of a predetermined sinusoidal frequency, $\omega_r$, to obtain a first modulated signal, "i" being an odd integer, "j" being an even integer, and "k" being a positive integer;
modulating, by the light intensity modulator, the light intensity of the source light beam by $\cos(j*\omega_r t)$ for k periods of the predetermined sinusoidal frequency, $\omega_r$, to obtain a second modulated signal;
splitting, by a beam splitter, a source light beam into a reference beam and a measurement beam, each of the source light beam, the reference beam, and the measurement beam having an optical path and an optical path length, the optical path length of the reference beam being measurable in wavelengths of the reference beam;
transmitting the measurement beam through a measurement sample in the optical path of the measurement beam;
receiving, at an optical detector, a combination of the reference beam and the measurement beam transmitted through the measurement sample;

detecting, by the optical detector, interference fringes resulting from the combination of the reference beam and the measurement beam, the detecting of the interference fringes including detecting an intensity signal, I(x,y,t), corresponding to an intensity of at least a portion of the combination of the reference beam and the measurement beam at a pixel position, x,y, and at a time, t, the first modulated signal being expressible as αI(x,y,t)sin($ω_r$t), the second modulated signal being expressible as I(x,y,t)cos(2$ω_r$t), and "α" being a predetermined constant;

modulating, by a light wavelength modulator, the optical path length of the reference beam by modulating a wavelength of the source light beam at a predetermined sinusoidal frequency, $ω_r$;

computing, by arctangent logic means, an arctangent of a quotient of the first modulated signal divided by the second modulated signal, the computed arctangent corresponding to one or more phases of the interference fringes; and unwrapping, by phase unwrapping logic means, the one or more phases of the interference fringes to obtain one or more physical distances relative to the measurement sample.

17. The method of claim 16 wherein the light intensity modulator is an acousto-optic modulator, wherein the method further comprises:

placing the acousto-optic modulator in the optical path of the source light beam, wherein the modulating of the light intensity of the source light beam by sin(i*$ω_r$t) for k periods of the predetermined sinusoidal frequency, $ω_r$, includes modulating the light intensity of the source light beam using the acousto-optic modulator; and wherein the modulating of the light intensity of the source light beam by cos(j*$ω_r$t) for k periods of the predetermined sinusoidal frequency, $ω_r$, includes modulating the light intensity of the source light beam using the acousto-optic modulator.

18. A method of operating an interferometer, comprising:

splitting, by a beam splitter, a source light beam into a reference beam and a measurement beam, each of the reference beam and the measurement beam having an optical path and an optical path length, the optical path length of the reference beam being measurable in wavelengths of the reference beam;

transmitting the measurement beam through a measurement sample in the optical path of the measurement beam;

receiving, at an optical detector, a combination of the reference beam and the measurement beam transmitted through the measurement sample;

detecting, by the optical detector, interference fringes resulting from the combination of the reference beam and the measurement beam, the detecting of the interference fringes including detecting an intensity signal, I(x,y,t), corresponding to an intensity of at least a portion of the combination of the reference beam and the measurement beam at a pixel position, x,y, and at a time, t, the optical detector having an associated frame rate, and "φ" representing one or more phases of the interference fringes;

modulating, by a modulator, a wavelength of the source light beam at a predetermined sinusoidal frequency, $ω_r$, that is synchronous with the frame rate of the optical detector, thereby modulating the optical path length of the reference beam;

calculating, by signal processing means, a sine of φ by applying a first predetermined modulation signal to the intensity signal, I(x,y,t), the first predetermined modulation signal being periodic and having values of 0, 1, 0, and −1 during four consecutive time segments, the four consecutive time segments each corresponding to a modulation period of the optical path length of the reference beam;

calculating, by the signal processing means, a cosine of φ by applying a second predetermined modulation signal to the intensity signal, I(x,y,t), the second predetermined modulation signal being periodic and having values of 1, −1, 1, and −1 during the four consecutive time segments;

obtaining, by the signal processing means, the one or more phases, φ, of the interference fringes from the sine of φ and the cosine of φ; and unwrapping, by the signal processing means, the one or more phases, φ, of the interference fringes to obtain one or more physical distances relative to the measurement sample.

* * * * *